US012671684B2

(12) United States Patent　　　　　　(10) Patent No.:　US 12,671,684 B2
Paixao　　　　　　　　　　　　　　　　(45) Date of Patent:　　Jun. 30, 2026

(54) SYSTEMS AND METHODS FOR PROACTIVELY UPGRADING LOW QUALITY ACCESS CREDENTIALS

(71) Applicant: Fortinet, Inc., Sunnyvale, CA (US)

(72) Inventor: Pedro Miguel Paixao, Sunrise, FL (US)

(73) Assignee: FORTINET, INC., Sunnyvale, CA (US)

( * ) Notice: Subject to any disclaimer, the term of this patent is extended or adjusted under 35 U.S.C. 154(b) by 524 days.

(21) Appl. No.: 17/540,819

(22) Filed: Dec. 2, 2021

(65) Prior Publication Data

US 2023/0179586 A1　　Jun. 8, 2023

(51) Int. Cl.
H04L 9/40　　　　(2022.01)

(52) U.S. Cl.
CPC .......... H04L 63/083 (2013.01); H04L 63/101 (2013.01); H04L 63/102 (2013.01); H04L 63/20 (2013.01)

(58) Field of Classification Search
CPC . H04L 63/1433; H04L 63/083; H04L 63/101; H04L 63/102; H04L 63/20
USPC ............................................................ 726/6
See application file for complete search history.

(56) References Cited

U.S. PATENT DOCUMENTS

| | | | | |
|---|---|---|---|---|
| 8,356,353 B2* | 1/2013 | Futoransky | ............. | H04L 43/50 |
| | | | | 726/25 |
| 10,142,113 B2* | 11/2018 | Zaidi | .................... | H04L 63/0823 |
| 10,218,735 B2* | 2/2019 | Strom | ..................... | G06F 30/20 |
| 10,645,075 B1* | 5/2020 | Rafferty | .............. | H04W 12/068 |
| 11,184,386 B1* | 11/2021 | Schroeder | ........... | H04L 63/0846 |
| 11,831,670 B1* | 11/2023 | Molls | ........................ | G06F 8/65 |
| 2017/0346809 A1* | 11/2017 | Plotnik | ................. | H04L 63/123 |
| 2020/0272728 A1* | 8/2020 | Edwards | ................. | G06F 21/45 |
| 2020/0322369 A1* | 10/2020 | Raghuramu | .......... | H04W 12/12 |
| 2021/0218765 A1* | 7/2021 | Rodriguez Bravo | ........................ | |
| | | | | H04L 63/1433 |
| 2022/0394457 A1* | 12/2022 | Mene | .................... | H04M 15/80 |

FOREIGN PATENT DOCUMENTS

GB　　　　　　2590467 A　 * 6/2021 　............. G06F 21/44

OTHER PUBLICATIONS

NPL Search Terms (Year: 2026).*
Mann, Prince, et al. "Classification of various types of attacks in IoT environment." 2020 12th international conference on computational intelligence and communication networks (CICN). IEEE, 2020 (Year: 2020).*

* cited by examiner

*Primary Examiner* — Syed A Zaidi
(74) *Attorney, Agent, or Firm* — Jaffery Watson Hamilton & DeSanctis LLP

(57)　　　　　　　ABSTRACT
Systems, devices, and methods are discussed for proactively addressing low quality access credentials in a network environment.

20 Claims, 6 Drawing Sheets

150

190

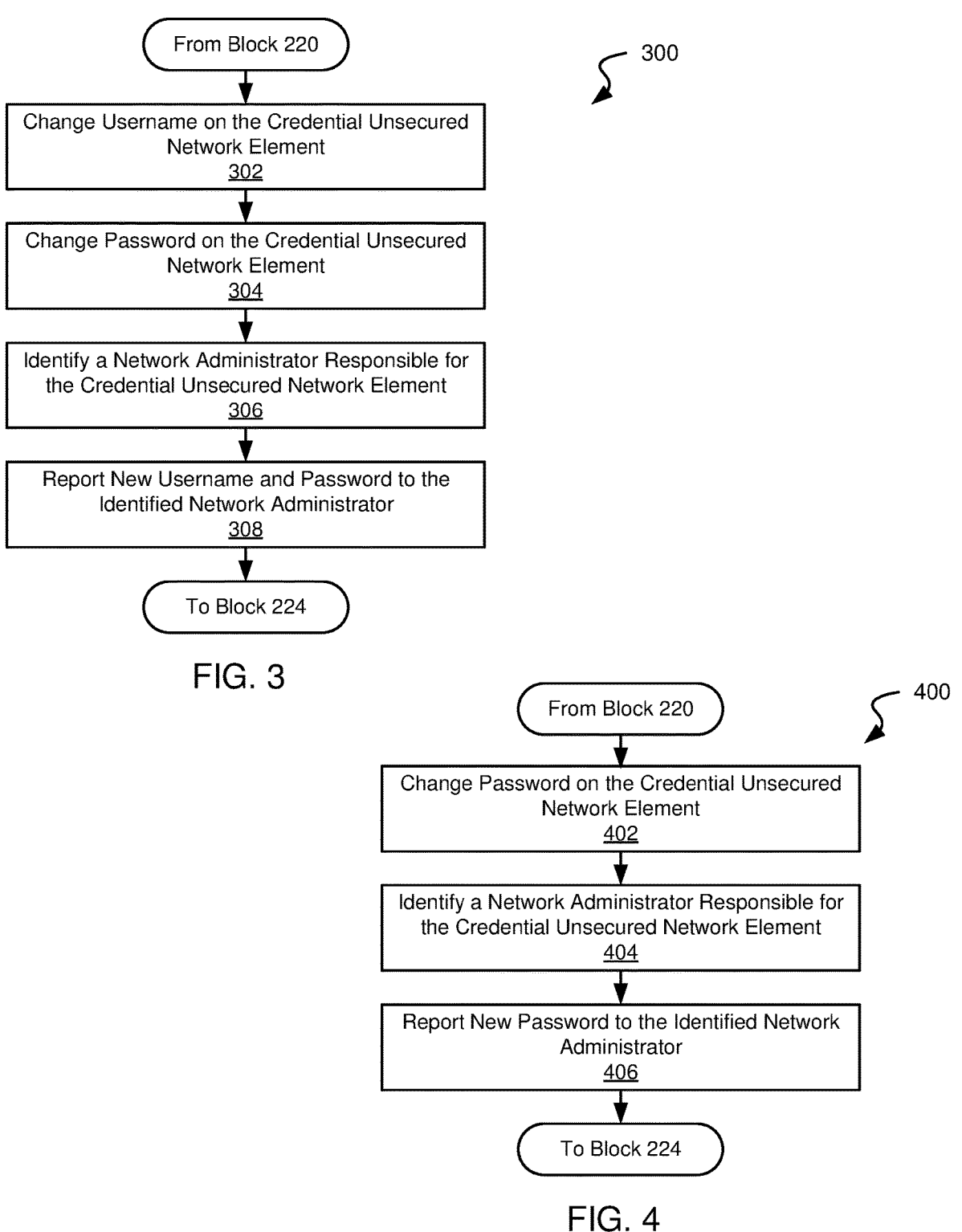

From Block 220

Change Username on the Credential Unsecured
Network Element
302

Change Password on the Credential Unsecured
Network Element
304

Identify a Network Administrator Responsible for
the Credential Unsecured Network Element
306

Report New Username and Password to the
Identified Network Administrator
308

To Block 224

From Block 220

Change Password on the Credential Unsecured
Network Element
402

Identify a Network Administrator Responsible for
the Credential Unsecured Network Element
404

Report New Password to the Identified Network
Administrator
406

To Block 224

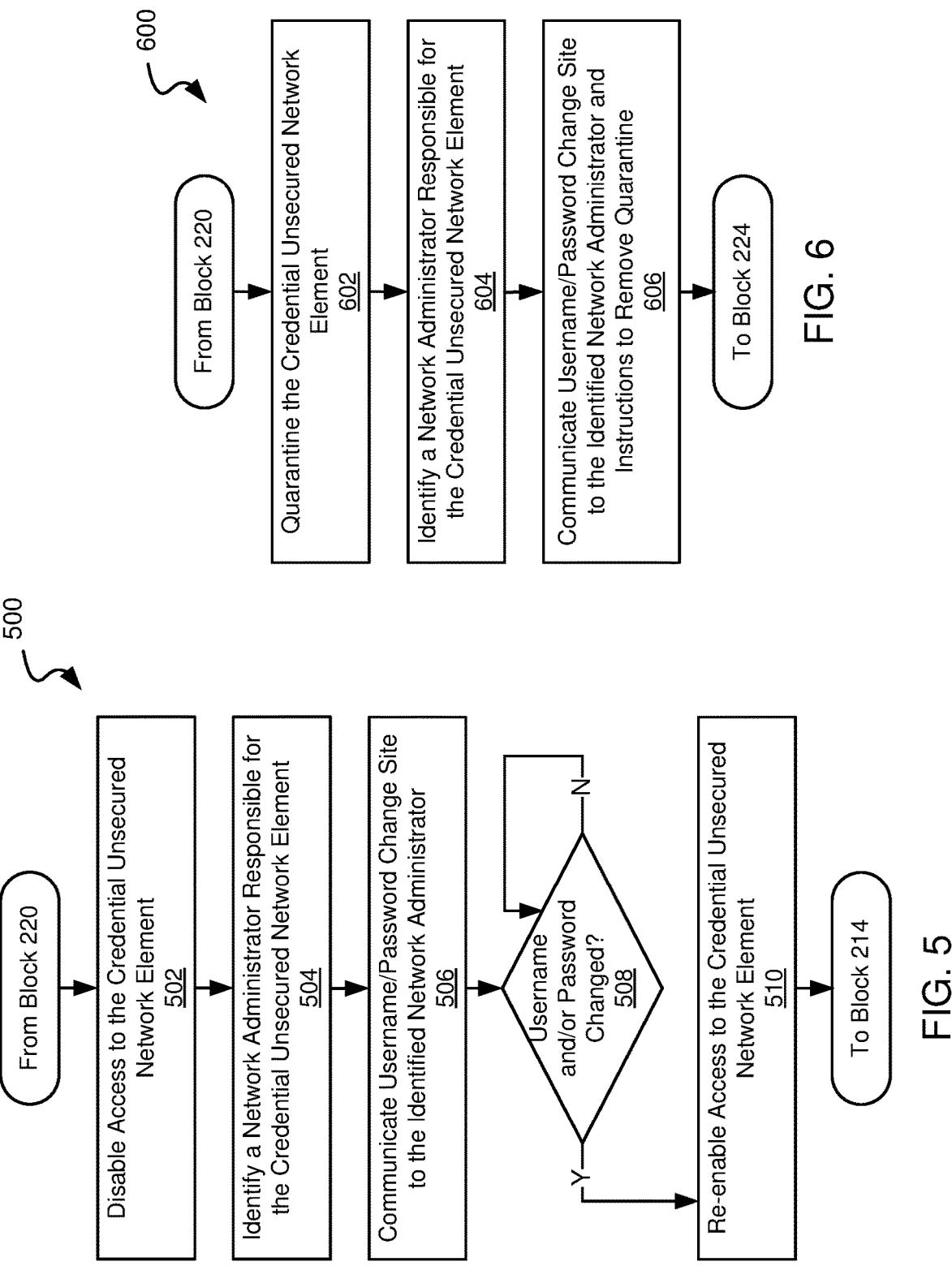

600

From Block 220

Quarantine the Credential Unsecured Network Element
602

Identify a Network Administrator Responsible for the Credential Unsecured Network Element
604

Communicate Username/Password Change Site to the Identified Network Administrator and Instructions to Remove Quarantine
606

To Block 224

From Block 220

Disable Access to the Credential Unsecured Network Element
502

Identify a Network Administrator Responsible for the Credential Unsecured Network Element
504

Communicate Username/Password Change Site to the Identified Network Administrator
506

Username and/or Password Changed?
508

N

Y

Re-enable Access to the Credential Unsecured Network Element
510

To Block 214

FIG. 5

SYSTEMS AND METHODS FOR PROACTIVELY UPGRADING LOW QUALITY ACCESS CREDENTIALS

COPYRIGHT NOTICE

FIELD

Embodiments discussed generally relate to securing network environments, and more particularly to systems and methods for proactively addressing low quality access credentials.

BACKGROUND

As devices are added to a network the potential for a network security breach occurs. This is particularly the case where an added device is protected by some combination of access credentials that are not modified from factory set defaults or that are modified by a network administrator but a weak combination of access credentials are chosen. If this is allowed to happen, it is unlikely that a network administrator will note the problem as the device is in fact secured by a combination of network credentials, albeit weak ones.

Thus, there exists a need in the art for more advanced approaches, devices and systems for identifying and proactively upgrading low quality network credentials.

SUMMARY

Various embodiments discussed generally relate to securing network environments, and more particularly to systems and methods for proactively addressing low quality access credentials.

This summary provides only a general outline of some embodiments. Many other objects, features, advantages and other embodiments will become more fully apparent from the following detailed description, the appended claims and the accompanying drawings and figures.

BRIEF DESCRIPTION OF THE DRAWINGS

A further understanding of the various embodiments may be realized by reference to the figures which are described in remaining portions of the specification. In the figures, similar reference numerals are used throughout several drawings to refer to similar components. In some instances, a sub-label consisting of a lower-case letter is associated with a reference numeral to denote one of multiple similar components. When reference is made to a reference numeral without specification to an existing sub-label, it is intended to refer to all such multiple similar components.

FIGS. 3-6 are flow diagrams showing methods in accordance with respective embodiments for implementing proactive security policies in relation to identified credential unsecure network elements.

DETAILED DESCRIPTION

Figure 1A:
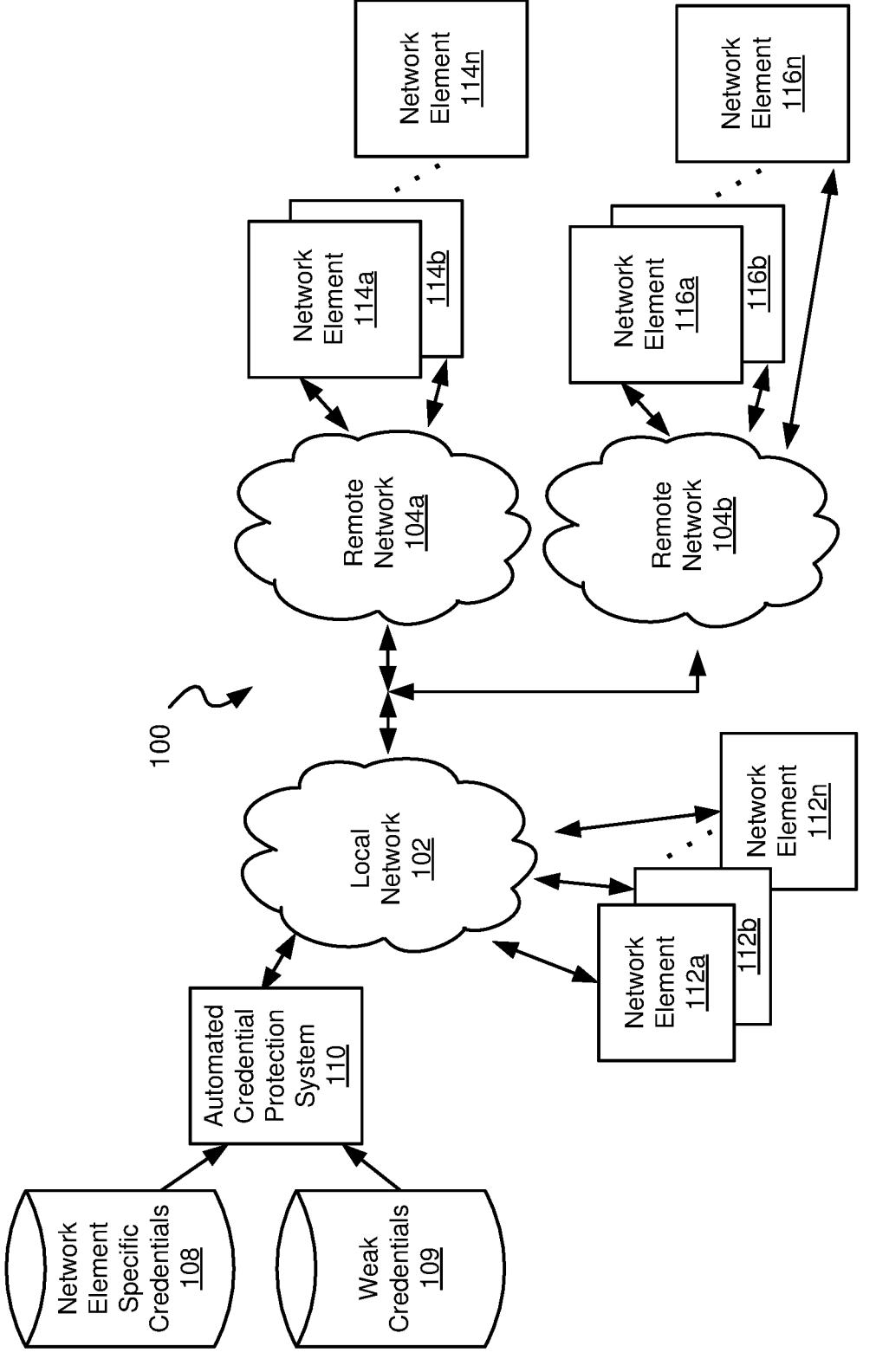
FIGS. 1A-1C illustrate a collection of interoperable networks including at least one automated password protection system configured to automatically police access credentials associated with network elements in the interoperable networks and to proactively address low quality access credentials in accordance with some embodiments.

Various embodiments discussed generally relate to securing network environments, and more particularly to systems and methods for proactively addressing low quality access credentials.

Many network devices, computing devices, Internet of Things ("IoT") devices, and network accessible applications, have factory set credentials (i.e., default credentials) that are readily found in the public domain for a given type of network element. Because such default credentials are publicly known they are considered to be a low quality access credential as their ability to stop undesired access is limited. Weak credentials chosen by a user are another type of low quality access credential that lack sufficient complexity or entropy, and thus are easily guessed. Dictionaries of commonly used passwords and/or combinations of user-names and passwords are available and can be used in, for example, network hacking in an attempt to gain access to a network element and/or network on which the network element is deployed.

It has been found that system administrators or users often leave default access credentials and/or choose weak passwords when incorporating a network element into a network. Where such occurs, the network is highly vulnerable to attack. Today's networks are often a complex combination of switches, routers, firewalls, servers, sensors, vending machines, and so on are connected all the time, many are installed by third parties and administrators have no easy way to determine whether what presents itself as secure is in fact secure. Because of the complexity of the networks, large numbers of network elements on a network, and/or the dynamic nature of network elements included in the network, it is increasingly difficult for network administrators to properly police and secure network elements. Further, due to the complexity of the networks and a propensity to use default access credentials and/or weak access credentials, the potential for malicious network access is high.

Various embodiments provide an automated process to detect improperly configured network elements in a network or networks that pose a potential security risk, and to proactively mitigate the security risk. In addition to or as part of proactively mitigating the security risk, a network administrator is alerted.

Embodiments of the present disclosure include various processes, which will be described below. The processes may be performed by hardware components or may be embodied in machine-executable instructions, which may be used to cause a general-purpose or special-purpose processor programmed with the instructions to perform the steps. Alternatively, processes may be performed by a combination of hardware, software, firmware and/or by human operators.

Embodiments of the present disclosure may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within a single computer) and storage systems containing or having network access to computer program(s) coded in accordance with various methods described herein, and the method steps of the disclosure could be accomplished by modules, routines, subroutines, or subparts of a computer program product.

In the following description, numerous specific details are set forth in order to provide a thorough understanding of embodiments of the present disclosure. It will be apparent to one skilled in the art that embodiments of the present disclosure may be practiced without some of these specific details.

Terminology

Brief definitions of terms used throughout this application are given below.

The terms "connected" or "coupled" and related terms, unless clearly stated to the contrary, are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

As used herein, a "network appliance" or a "network device" generally refers to a device or appliance in virtual or physical form that is operable to perform one or more network functions. In some cases, a network appliance may be a database, a network server, or the like. Some network devices may be implemented as general-purpose computers or servers with appropriate software operable to perform the one or more network functions. Other network devices may also include custom hardware (e.g., one or more custom Application-Specific Integrated Circuits (ASICs)). Based upon the disclosure provided herein, one of ordinary skill in the art will recognize a variety of network appliances that may be used in relation to different embodiments. In some cases, a network appliance may be a "network security appliance" or a network security device" that may reside within the particular network that it is protecting or network security may be provided as a service with the network security device residing in the cloud. For example, while there are differences among network security device vendors, network security devices may be classified in three general performance categories, including entry-level, midrange, and high-end network security devices. Each category may use different types and forms of central processing units (CPUs), network processors (NPs), and content processors (CPs). NPs may be used to accelerate traffic by offloading network traffic from the main processor. CPs may be used for security functions, such as flow-based inspection and encryption. Entry-level network security devices may include a CPU and no co-processors or a system-on-a-chip (SoC) processor that combines a CPU, a CP and an NP. Mid-range network security devices may include a multi-core CPU, a separate NP Application-Specific Integrated Circuits (ASIC), and a separate CP ASIC. At the high-end, network security devices may have multiple NPs and/or multiple CPs. A network security device is typically associated with a particular network (e.g., a private enterprise network) on behalf of which it provides the one or more security functions. Non-limiting examples of security functions include authentication, next-generation firewall protection, antivirus scanning, content filtering, data privacy protection, web filtering, network traffic inspection (e.g., secure sockets layer (SSL) or Transport Layer Security (TLS) inspection), intrusion prevention, intrusion detection, denial of service attack (DoS) detection and mitigation, encryption (e.g., Internet Protocol Secure (IPSec), TLS, SSL), application control, Voice over Internet Protocol (VoIP) support, Virtual Private Networking (VPN), data leak prevention (DLP), antispam, antispyware, logging, reputation-based protections, event correlation, network access control, vulnerability management, and the like. Such security functions may be deployed individually as part of a point solution or in various combinations in the form of a unified threat management (UTM) solution. Non-limiting examples of network security appliances/devices include network gateways, VPN appliances/gateways, UTM appliances (e.g., the FORTIGATE family of network security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), network access control appliances (e.g., FORTINAC family of network access control appliances), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name System (DNS) appliances (e.g., FORTIDNS family of DNS appliances), wireless security appliances (e.g., FORTI-WIFI family of wireless security gateways), virtual or physical sandboxing appliances (e.g., FORTISANDBOX family of security appliances), and DoS attack detection appliances (e.g., the FORTIDDOS family of DoS attack detection and mitigation appliances).

As used herein, the phrase "network element" generally refers to any element that is accessible via computer network. Such elements may include, but are not limited to, a network appliance, a network device, a computing devices, an Internet of Things ("IoT") device, and/or network accessible application. Based upon the disclosure provided herein, one of ordinary skill in the art will recognize a variety of network elements that may be used in relation to different embodiments discussed herein.

As used herein, the phrase "network resources" is used in its broadest sense to mean any resource accessible within a network that is associated with one or more Internet Protocol (IP) addresses. Based upon the disclosure provided herein, one of ordinary skill in the art will recognize a variety of network resources that may be used in relation to different embodiments.

As used herein, the phrase "network element" generally refers to any element that is accessible via computer network. Such elements may include, but are not limited to, a network appliance, a network device, a computing devices, an Internet of Things ("IoT") device, a network resource, and/or network accessible application. Based upon the disclosure provided herein, one of ordinary skill in the art will recognize a variety of network elements that may be used in relation to different embodiments discussed herein.

As used herein, the phrase "access credential" is used in its broadest sense to mean any code or combinations of codes that are necessary to access a network element. Such elements may include, but are not limited to, a username, a password, or a combination of username and password. Based upon the disclosure provided herein, one of ordinary skill in the art will recognize a variety of access credentials that may be used in relation to different embodiments discussed herein.

The phrase "processing resource" is used in its broadest sense to mean one or more processors capable of executing instructions. Such processors may be distributed within a network environment or may be co-located within a single network appliance. Based upon the disclosure provided herein, one of ordinary skill in the art will recognize a variety of processing resources that may be used in relation to different embodiments.

Example embodiments will now be described more fully hereinafter with reference to the accompanying drawings, in which exemplary embodiments are shown. This disclosure may, however, be embodied in many different forms and should not be construed as limited to the embodiments set forth herein. It will be appreciated by those of ordinary skill in the art that the diagrams, schematics, illustrations, and the like represent conceptual views or processes illustrating systems and methods embodying various aspects of the present disclosure. The functions of the various elements shown in the figures may be provided through the use of dedicated hardware as well as hardware capable of executing associated software and their functions may be carried out through the operation of program logic, through dedicated logic, through the interaction of program control and dedicated logic.

Some embodiments provide methods for proactively policing and securing network elements. Such embodiments include: identifying, by a processing resource, a network element on a computer network; attempting, by the processing resource, to access the network element using an access credential, where the access credential is one of a default access credential specific to a type of network element corresponding to the network element, or a weak access credential; and based upon a successful access to the network element using the access credential, applying, by the processing resource, a security process to the network element to render the network element secure. In some instances of the aforementioned embodiments, the methods further include: identifying, by the processing resource, a network administrator associated with the network element; and communicating, by the processing resource, a change implemented by the security process to the network administrator.

In various instances of the aforementioned embodiments, applying the security process includes changing a password for the network element to use an updated password. In some such instances, applying the security process further includes changing a username for the network element. In various such instances, communicating the change implemented by the security process includes communicating the updates password to the network administrator.

In other instances of the aforementioned embodiments, applying the security process further includes changing a username for the network element. In yet other instances of the aforementioned embodiments, applying the security process includes disabling access to the network element. In some such instances where the access credential is a first access credential, the methods further include: re-enabling access to the network element; attempting, by the processing resource, to access the network element using the first access credential and a second access credential; wherein the second access credential is a weak access credential; and based upon a successful access to the network element using the second access credential, re-applying, by the processing resource, the security process to the network element to render the network element secure.

In some instances of the aforementioned embodiments, applying the security process includes quarantining the network element. In various instances of the aforementioned embodiments, identifying the network element on a computer network includes determining, by the processing resource, that the network element on a computer network has been added to the computer network. In one or more instances of the aforementioned embodiments where the type of network element is a first type of network element, the access credential is a first access credential, and the network element is a first network element, the methods further include: identifying, by the processing resource, a second network element on the computer network; attempting, by the processing resource, to access the network element using a second access credential, where the second access credential is one of a default access credential specific to a second type of network element corresponding to the second network element, and a weak access credential; based upon a successful access to the network element using the second access credential, applying, by the processing resource, the security process to the second network element to render the second network element secure.

Other embodiments provide systems for proactively policing and securing network elements. Such systems include: a processing resource, and a non-transitory computer-readable medium coupled to the processing resource. The non-transitory computer-readable medium has stored therein instructions that when executed by the processing resource cause the processing resource to: identify a network element on a computer network; attempt to access the network element using an access credential, where the access credential is selected from a group consisting of: a default access credential specific to a type of network element corresponding to the network element, and a weak access credential; and based upon a successful access to the network element using the access credential, apply a security process to the network element to render the network element secure.

Yet other embodiments provide non-transitory computer-readable media having stored therein instructions that when executed by the processing resource cause a processing resource to: identify a network element on a computer network; attempt to access the network element using an access credential, where the access credential is selected from a group consisting of: a default access credential specific to a type of network element corresponding to the network element, and a weak access credential; and based upon a successful access to the network element using the access credential, apply a security process to the network element to render the network element secure.

Turning to FIG. 1A, a collection of interoperable networks (a local network 102, a remote network 104a, and a remote network 104b) including at least one automated credential protection system 110 configured to automatically police access credentials associated with network elements, and to proactively address low quality access credentials in accordance with some embodiments. As shown local network includes a number of network elements 112 (i.e., a network element 112a, a network element 112b, and a network element 112n); remote network 104a includes a number of network elements 114 (i.e., a network element 114a, a network element 114b, and a network element 114n); and remote network 104b includes a number of network elements 116 (i.e., a network element 116a, a network element 116b, and a network element 116n). Each of network elements 112, 114, 116 are protected by access credentials. Based upon the disclosure provided herein, one of ordinary skill in the art will recognize a variety of types of network elements that may be included in local network 102, remote network 104a, and/or remote network 104b.

Local network 102, remote network 104a, and remote network 104b each may be any type of communication network known in the art. Those skilled in the art will appreciate that any of the aforementioned networks can be a wireless network, a wired network or a combination thereof that can be implemented as one of the various types of networks, such as an Intranet, a Local Area Network (LAN), a Wide Area Network (WAN), an Internet, and the like. Further, secured network 101 can either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like.

Local network 102 is differentiated from both remote network 104a and remote network 104b due to automated credential protection system 110 being deployed locally to local network 102. While the embodiment is shown as having three networks, other embodiments may have more or fewer networks. Further, while the embodiment is shown as having only one automated credential protection system 110, it is possible to have automated credential protection system 110 deployed in relation to one or both of remote network 104a and remote network 104b in which case the remote network having the automated credential protection would be considered a local network.

Automated credential protection system 110 is communicably coupled to a network element specific credential database 108 and a weak credential database 109. Network element specific credential database 108 includes a number of access credentials known to be factory set for specific network elements. In accessing network element specific credential database 108, automated credential protection system 110 uses a known network element to obtain the default access credential for that particular network element. Weak credential database 109 includes a large number of weak credentials that are commonly used by users to protect access to network elements. Any dictionary of commonly used passwords and/or combinations of usernames and passwords available in the art may be used as weak credential database 109. As such weak credentials, unlike default access credentials, are not specific to any given network element, automated credential protection system 110 may simply access such access credentials one after another in any order. In one particular embodiment, such weak access credentials are accessed and used by automated credential protection system 110 based upon an order of likelihood with the most commonly used weak access credential being accessed and used first followed by less common credentials in a descending order. An order of accessing and using default credentials first followed by weak credentials in the aforementioned prioritized order makes the process of automatically policing access credentials more efficient.

Figure 1B:
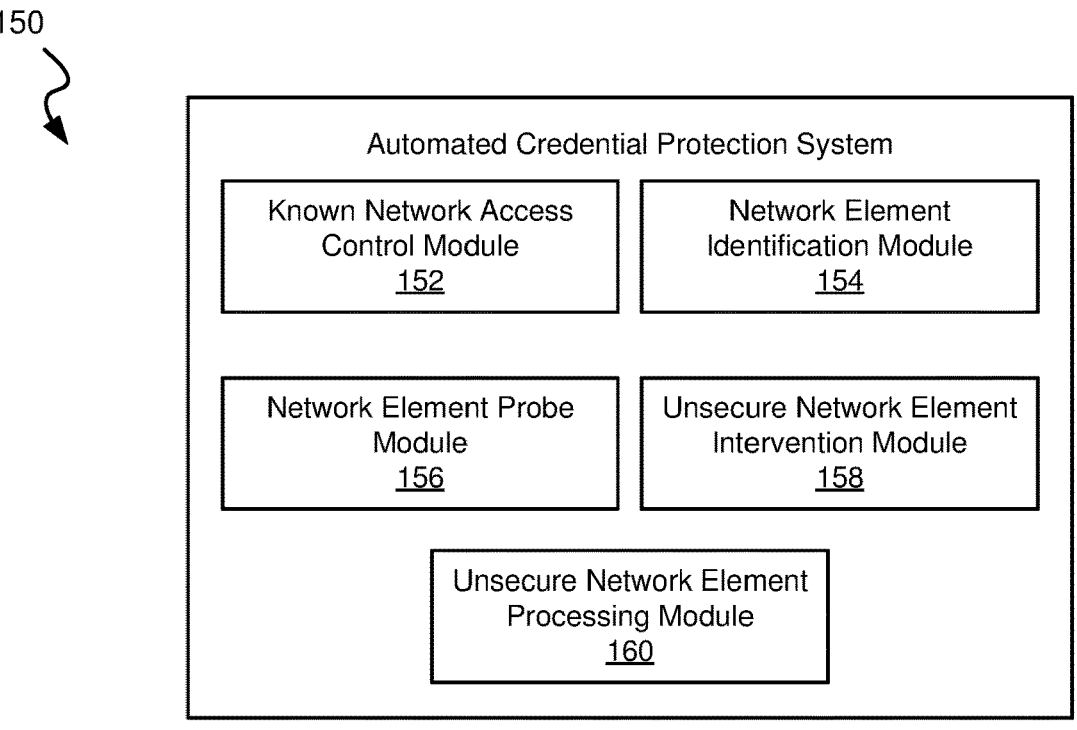

Turning to FIG. 1B, a block diagram 150 of one embodiment of automated credential protection system 110 is discussed. As shown, the embodiment of automated credential protection system 110 includes a known network access control module 152, a network element identification module 154, a network element probe module 156, an unsecure network element intervention module 158, and an unsecure network element processing module 160.

Known network access control module 152 is configured to facilitate access to any network to which the services of automated credential protection system 110 are to be used. Thus, for example, where automated credential protection system 110 is to be used in relation to local network 102, remote network 104a, and remote network 104b, known network access control module 152 is configured to negotiate access into such networks.

Network element identification module 154 is configured to identify network elements included on a network. In some embodiments, network element identification module 154 is configured to access a network access control list for the network, and from there to assemble a list of all identified network elements. In other embodiments, network element identification module 154 is configured to probe the network through a combination of network traffic monitoring and/or proactive network calls to identify network elements accessible via the network. For example, an automated credential protection system may detect network elements based upon communication patterns observed in on the selected network, and/or MAC addresses visible in network traffic.

Network element probe module 156 is configured to test access to a selected network element by applying one or more access credentials to the network element to determine if access can be achieved. Such a credential security test includes first using a default access credential for the selected network element. This default access credential is available from a network element specific credential database and is generally the factory set credential that is publicly known for the particular network element. If the default access credential facilitates access to the selected network element, no more testing is performed. Where either a default credential is not available for the particular network element, weak access credentials from a weak credentials database are attempted one after another until either there are not any more weak access credentials to be tested or an access credential that facilitates access to the selected network element is found. In some embodiments, the automated credential protection system may simply test weak access credentials one after another in any order. In one particular embodiment, such weak access credentials are tested by automated credential protection system based upon an order of likelihood with the most commonly used weak access credential being accessed and used first followed by less common credentials in a descending order. An order of accessing and using default credentials first followed by weak credentials in the aforementioned prioritized order makes the process of automatically policing access credentials more efficient.

Unsecure network element intervention module 158 is configured to initially secure an identified unsecure network element. Such securing can include using access credential information identified by network element probe module 156 to change the username and/or password of the network element is a more secure access credential. Alternatively, such securing can include disabling the unsecure network element or quarantining the unsecured network element.

Unsecure network element processing module 160 is configured to identify a network administrator overseeing the unsecure network element to provide instructions and where applicable to follow up to automatically test whether the instructions had been followed.

Figure 1C:
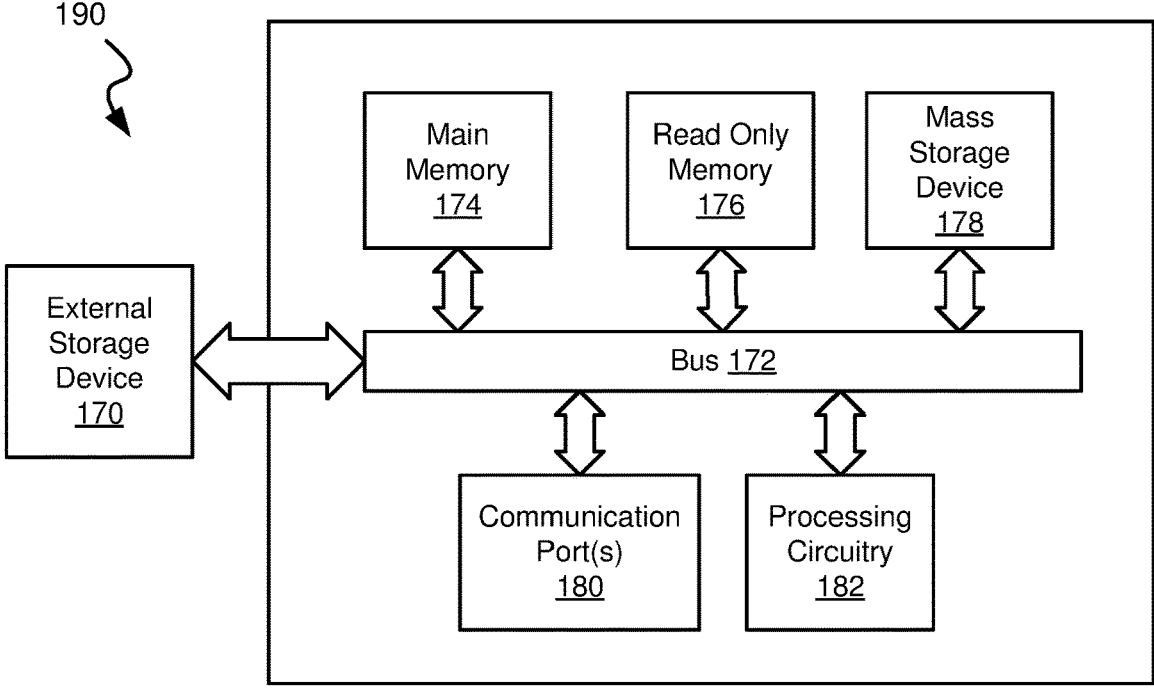

Turning to FIG. 1C, an example computer system 190 is shown in which or with which embodiments of the present disclosure may be utilized. As shown in FIG. 1C, computer system 190 includes an external storage device 170, a bus 172, a main memory 174, a read-only memory 176, a mass storage device 178, one or more communication ports 1010, and one or more processing resources (e.g., processing circuitry 182). In one embodiment, computer system 190 may represent some portion of automated credential protection system 110, and/or a network element 112, 114, 116.

Those skilled in the art will appreciate that computer system 190 may include more than one processing resource 182 and communication port 180. Non-limiting examples of processing resources include, but are not limited to, Intel Quad-Core, Intel i3, Intel i5, Intel i7, Apple M1, AMD Ryzen, or AMD® Opteron® or Athlon MP® processor(s), Motorola® lines of processors, FortiSOC™ system on chip processors or other future processors. Processors 182 may include various modules associated with embodiments of the present disclosure.

Communication port 180 can be any of an RS-232 port for use with a modem-based dialup connection, a 10/100 Ethernet port, a Gigabit, 10 Gigabit, 25G, 40G, and 100G port using copper or fiber, a serial port, a parallel port, or other existing or future ports. Communication port 760 may be chosen depending on a network, such as a Local Area Network (LAN), Wide Area Network (WAN), or any network to which the computer system connects.

Memory 174 can be Random Access Memory (RAM), or any other dynamic storage device commonly known in the art. Read only memory 176 can be any static storage device(s) e.g., but not limited to, a Programmable Read Only Memory (PROM) chips for storing static information e.g. start-up or BIOS instructions for the processing resource.

Mass storage 178 may be any current or future mass storage solution, which can be used to store information and/or instructions. Non-limiting examples of mass storage solutions include Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1300), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 172 communicatively couples processing resource(s) with the other memory, storage and communication blocks. Bus 172 can be, e.g. a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processing resources to software system.

Optionally, operator and administrative interfaces, e.g., a display, keyboard, and a cursor control device, may also be coupled to bus 172 to support direct operator interaction with the computer system. Other operator and administrative interfaces can be provided through network connections connected through communication port 180. External storage device 190 can be any kind of external hard-drives, floppy drives, IOMEGA® Zip Drives, Compact Disc-Read Only Memory (CD-ROM), Compact Disc-Rewritable (CD-RW), Digital Video Disk-Read Only Memory (DVD-ROM). Components described above are meant only to show various possibilities. In no way should the aforementioned example computer system limit the scope of the present disclosure.

Figure 2:
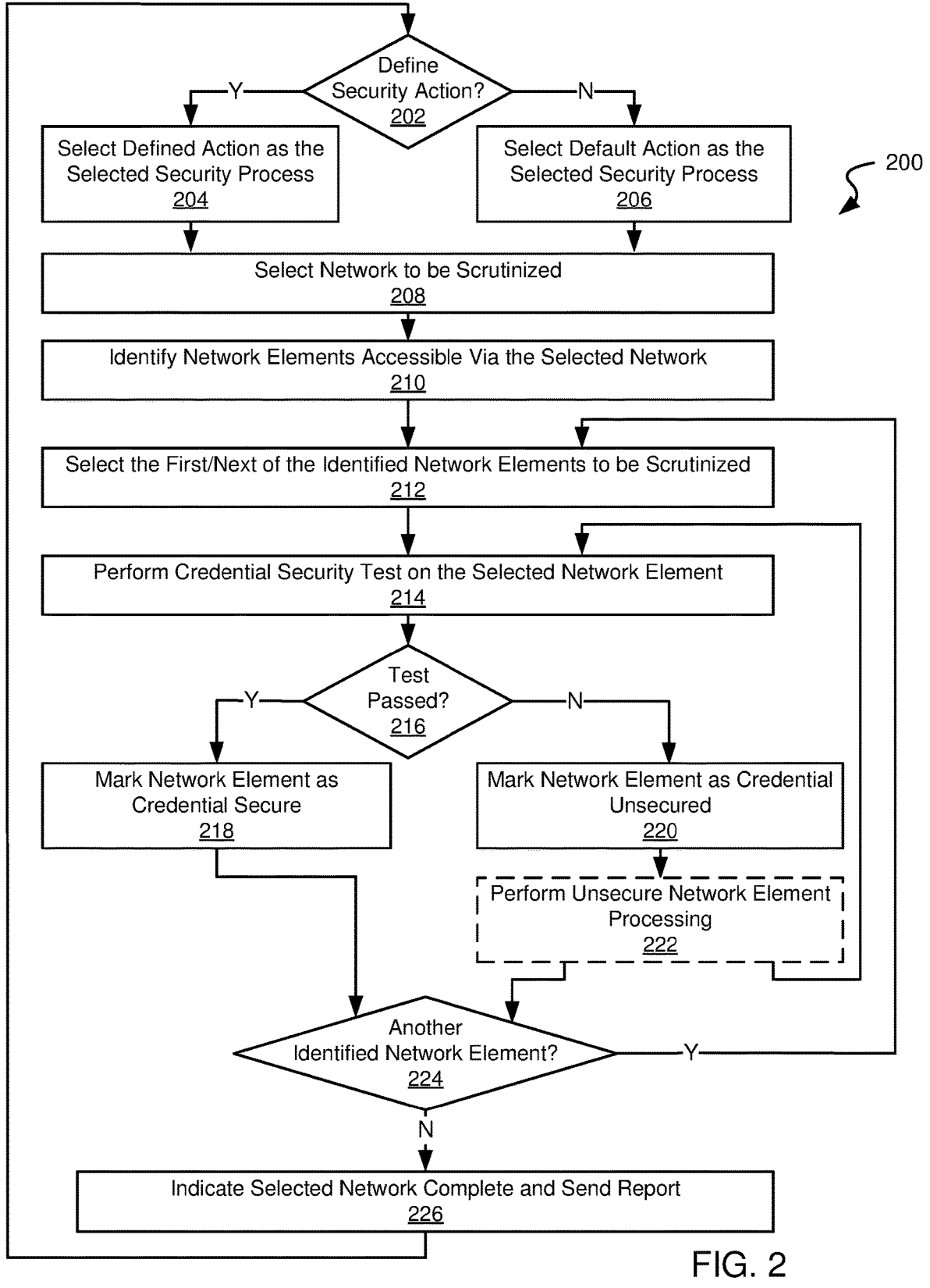
FIG. 2 is a flow diagram showing a method in accordance with various embodiments for automatically policing access credentials associated with network elements across one or more networks and proactively addressing low quality access credentials.

Turning to FIG. 2, a flow diagram 200 shows a method in accordance with various embodiments for automatically policing access credentials associated with network elements across one or more networks and proactively addressing low quality access credentials. Following flow diagram 200, it is determined whether a user, such as a network administrator, wants to define a security action to be taken when a network element is identified as "credential unsecured" (block 202). Where the user either does not provide a defined action or proactively elects not to provide such a defined action (block 202), a default action is selected as a selected security process (block 206). Otherwise, where the user provides a defined action (block 202), the provided, defined action is selected as the selected security process (block 204). This selected security process will be used in relation to any network element is identified as credential unsecured as discussed below in relation to block 222.

A network to be scrutinized is selected (block 208). In a simple situation where an automated credential protection system is used only in relation to one network, that network is selected. Alternatively, where the automated credential protection system is used in relation to two or more local and/or remote networks, one of the two or more local and/or remote networks is selected.

Network elements accessible as part of the selected network are identified (block 210). In some embodiments, this process may include accessing an access control list identifying all of the network elements included in the selected network. Such access control networks may be maintained, for example, by one or more network appliances deployed on the network. In other embodiments, the process of identifying the network elements may be done by probing the network through a combination of network traffic monitoring and/or proactive network calls to identify network elements accessible via the network. For example, an automated credential protection system may detect network elements based upon communication patterns observed in on the selected network, and/or MAC addresses visible in network traffic. Based upon the disclosure provided herein, one of ordinary skill in the art will recognize a variety of approaches that may be used in relation to different embodiments to identify network elements deployed on a selected network.

The first/next network element of the network elements identified on the selected network is selected for processing (block 212). In some embodiments, the order of the network elements is selected based upon which was identified first. In other embodiments, the order of the network elements is selected based upon a likelihood that the type of network element will be the subject of a malicious attack. Based upon the disclosure provided herein, one of ordinary skill in the art will recognize a variety of orders in which network elements may be selected for processing.

A credential security test is applied to the selected network element (block 214). Such a credential security test includes first using a default access credential for the selected network element. This default access credential is available from a network element specific credential database and is generally the factory set credential that is publicly known for the particular network element. If the default access credential facilitates access to the selected network element, no more testing is performed. Where either a default credential is not available for the particular network element, weak access credentials from a weak credentials database are attempted one after another until either there are not any more weak access credentials to be tested or an access credential that facilitates access to the selected network element is found. In some embodiments, the automated credential protection system may simply test weak access credentials one after another in any order. In one particular embodiment, such weak access credentials are tested by automated credential protection system based upon an order of likelihood with the most commonly used weak access credential being accessed and used first followed by less common credentials in a descending order. An order of accessing and using default credentials first followed by weak credentials in the aforementioned prioritized order makes the process of automatically policing access credentials more efficient.

Where none of the default access credential or weak access credentials facilitates access to the selected network element (block 216), the selected network element is marked as "credential secure" (block 218). Otherwise, once any of the default access credential or one of the weak access credentials is found to facilitate access to the selected network element, the selected network element is marked as "credential unsecure" (block 220), and unsecure network element processing is triggered (block 222). Block 222 is shown in dashed lines as it may be any process that is used to proactively eliminate the security risk found with the selected network element. Various process for proactively eliminate the security risk found with the selected network element are discussed below in relation to FIGS. 3-6 that may be used in relation to different embodiments. The process that is used is that selected in blocks 204, 206 above, and any of the processes discussed below in relation to FIGS. 3-6 may be either a default action or a defined action depending upon the particular embodiment.

Turning to FIG. 3, a flow diagram 300 shows an unsecure network element processing process that may be used in relation to some embodiments. As mentioned above, this process may be used in place of block 222 of FIG. 2. Following flow diagram 300, the username of the credential unsecured network element is changed (block 302). This change is made possible because the access credentials for the network element was discovered in performing the processes of block 214 discussed above in relation to FIG. 2. In addition, the password for the credential unsecured network element is changed (block 304). Again, this change is possible because the access credentials for the network element was discovered in performing the processes of block 214 discussed above in relation to FIG. 2. The username and/or password are changed to something that is not part of either a default access credential or a weak access credential. At this juncture the unsecured network element has been proactively rendered secure.

In addition to securing the network element, a network administrator overseeing the previously unsecure network element is identified (block 306). This identification may be made, for example, by accessing a network access table maintained in relation to the network. Alternatively, the contact information for the network administrator may be programmed as part of the unsecure network element processing process. Based upon the disclosure provided herein, one of ordinary skill in the art will recognize a variety of approaches for identifying a network administrator associated with the previously unsecure network element. Once identified, the new username and password for the previously unsecure network element are reported to the network administrator (block 308). This would allow the network administrator to access the previously unsecure network element to update the access credentials for the network element to something known to the network administrator. Thus, not only is the network administrator alerted to the potential security issue, the issue is resolved and the network administrator can later update the resolution to their selected access credential.

Turning to FIG. 4, a flow diagram 400 shows another unsecure network element processing process that may be used in relation to various embodiments. As mentioned above, this process may be used in place of block 222 of FIG. 2. Following flow diagram 400, the password for the credential unsecured network element is changed (block 402). This change is possible because the access credentials for the network element was discovered in performing the processes of block 214 discussed above in relation to FIG. 2. The password is changed to something that is not part of either a default access credential or a weak access credential. At this juncture the unsecured network element has been proactively rendered secure.

In addition to securing the network element, a network administrator overseeing the previously unsecure network element is identified (block 404). This identification may be made, for example, by accessing a network access table maintained in relation to the network. Alternatively, the contact information for the network administrator may be programmed as part of the unsecure network element processing process. Based upon the disclosure provided herein, one of ordinary skill in the art will recognize a variety of approaches for identifying a network administrator associated with the previously unsecure network element. Once identified, the new password for the previously unsecure network element are reported to the network administrator (block 406). This would allow the network administrator to access the previously unsecure network element to update the access credentials for the network element to something known to the network administrator. Thus, not only is the network administrator alerted to the potential security issue, the issue is resolved and the network administrator can later update the resolution to their selected access credential.

Turning to FIG. 5, a flow diagram 500 shows another unsecure network element processing process that may be used in relation to one or more embodiments. As mentioned above, this process may be used in place of block 222 of FIG. 2. Following flow diagram 500, access to the credential unsecured network element is disabled (block 502). In some embodiments, this includes removing the network element from network registries and thereby effectively removing the network element from the network. At this juncture the unsecured network element has been proactively rendered secure by eliminating it from the network.

In addition to securing the network element, a network administrator overseeing the previously unsecure network element is identified (block 504). This identification may be made, for example, by accessing a network access table maintained in relation to the network. Alternatively, the contact information for the network administrator may be programmed as part of the unsecure network element processing process. Based upon the disclosure provided herein, one of ordinary skill in the art will recognize a variety of approaches for identifying a network administrator associated with the previously unsecure network element. Once identified, a communication is sent to the identified network administrator indicating the change that has been made, and instructing the network administrator to update the username and/or password for the network element (block 506).

It is determined whether the network administrator has completed the update to the username and/or password for the network element (block 508). This may be determined, for example, by receiving a communication from the network administrator indicating that the process is completed. Based upon the disclosure provided herein, one of ordinary skill in the art will recognize a variety of ways in which completion of the process by the network administrator can be completed. Once completed, the disabling process of block 502 is reversed and access to the network element is re-enabled (block 510). Of note, the process returns to block 214 of FIG. 2 where the newly updated access credential can be retested.

Turning to FIG. 6, a flow diagram 600 shows yet another unsecure network element processing process that may be used in relation to some embodiments. As mentioned above, this process may be used in place of block 222 of FIG. 2. Following flow diagram 600, the credential unsecured network element is quarantined (block 602). Any network element quarantining process known in the art may be used including, but not limited to, moving the network element to a sandbox. At this juncture the unsecured network element has been proactively rendered secure by controlling it within a quarantine scenario.

In addition to securing the network element, a network administrator overseeing the previously unsecure network element is identified (block 604). This identification may be made, for example, by accessing a network access table maintained in relation to the network. Alternatively, the contact information for the network administrator may be programmed as part of the unsecure network element processing process. Based upon the disclosure provided herein, one of ordinary skill in the art will recognize a variety of approaches for identifying a network administrator associated with the previously unsecure network element. Once identified, a communication is sent to the identified network administrator indicating the change that has been made, instructing the network administrator to update the username and/or password for the network element, and describing to the network administrator how to remove the network element from quarantine (block 606).

Returning to FIG. 2, it is determined whether another identified network element remains to be tested and processed (block 224). Where another network element remains (block 224), the next identified network element is selected (block 212) and the processes of block 214-224 are repeated for the newly selected network element. Otherwise, once no more network elements remain to be processed (block 224), the network is indicated as complete and a report is sent to a network administrator overseeing the network (block 226).

Figure 7:
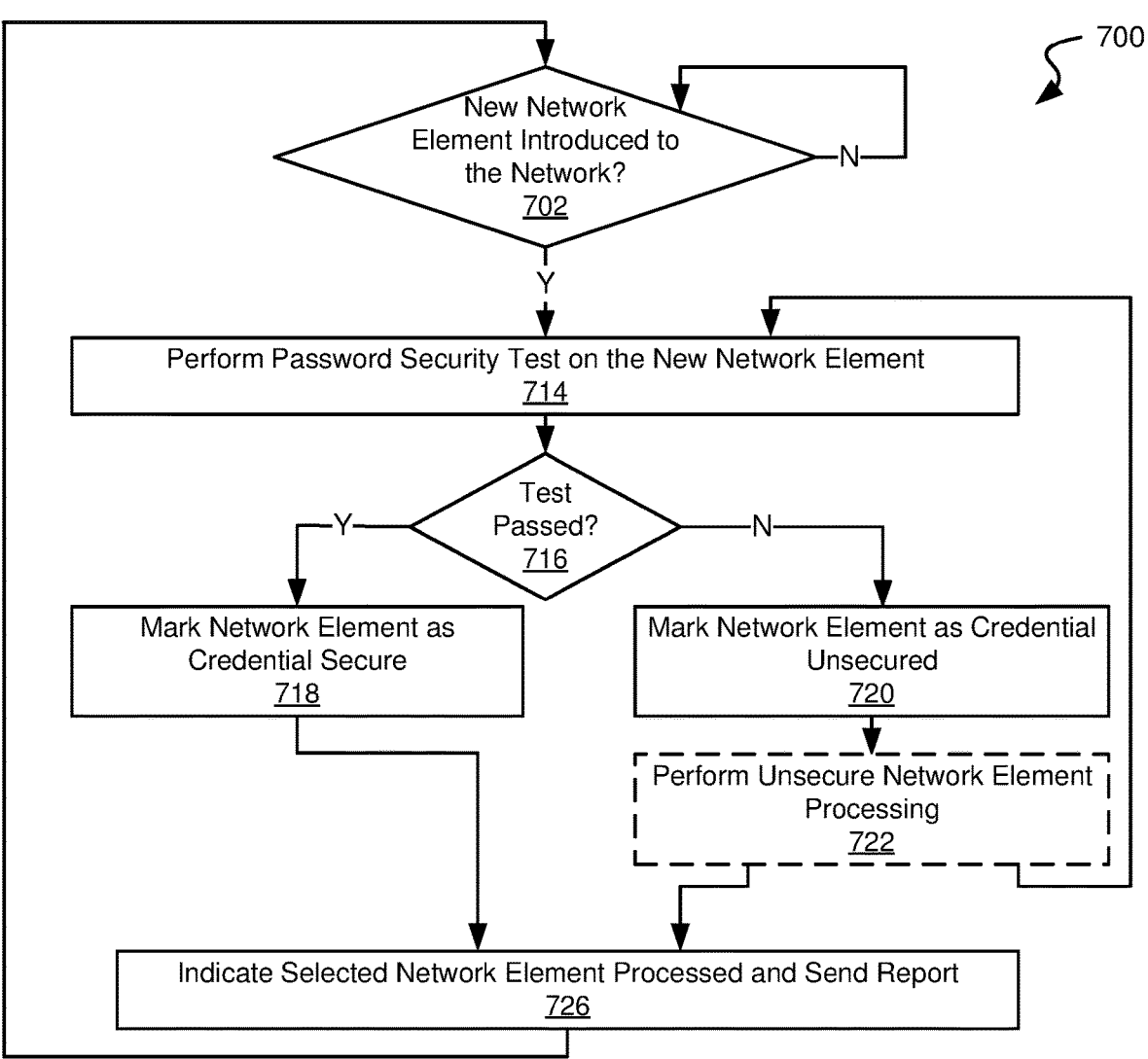
FIG. 7 is a flow diagram showing a method in accordance with various embodiments for automatically policing access credentials associated with a newly introduced network element and proactively addressing a low quality access credential of the newly introduced network element.

Turning to FIG. 7, a flow diagram 700 shows a method in accordance with various embodiments for automatically policing access credentials associated with a newly introduced network element and proactively addressing a low quality access credential of the newly introduced network element. Following flow diagram 700, it is determined whether a new network element has been introduced to a network (block 702). This may be done by integrating the process of flow diagram 700 into an existing process for adding a network element to a network. Based upon the disclosure provided herein, one of ordinary skill in the art will recognize a variety of ways to determine whether a network element has been newly added to a network.

Where it is determined that a network element has been added to the network (block 702), a credential security test is applied to the selected network element (block 714). Such a credential security test includes first using a default access credential for the selected network element. This default access credential is available from a network element specific credential database and is generally the factory set credential that is publicly known for the particular network element. If the default access credential facilitates access to the selected network element, no more testing is performed. Where either a default credential is not available for the particular network element, weak access credentials from a weak credentials database are attempted one after another until either there are not any more weak access credentials to be tested or an access credential that facilitates access to the selected network element is found. In some embodiments, the automated credential protection system may simply test weak access credentials one after another in any order. In one particular embodiment, such weak access credentials are tested by automated credential protection system based upon an order of likelihood with the most commonly used weak access credential being accessed and used first followed by less common credentials in a descending order. An order of accessing and using default credentials first followed by weak credentials in the aforementioned prioritized order makes the process of automatically policing access credentials more efficient.

Where none of the default access credential or weak access credentials facilitates access to the selected network element (block 716), the network element is marked as "credential secure" (block 718). Otherwise, once any of the default access credential or one of the weak access credentials is found to facilitate access to the selected network element, the selected network element is marked as "credential unsecure" (block 720), and unsecure network element processing is triggered (block 722). Block 722 is shown in dashed lines as it may be any process that is used to proactively eliminate the security risk found with the selected network element. Various process for proactively eliminate the security risk found with the selected network element are discussed above in relation to FIGS. 3-6 that may be used in relation to different embodiments. Finally, the network element is indicated as complete and a report is sent to a network administrator overseeing the network (block 726).

In conclusion, the present invention provides for novel systems, devices, and methods. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A method for proactively policing and securing network elements, the method comprising:
   receiving, by a computing system, information describing types of network elements on a network;
   generating, by the computing system, an ordering of the set of network elements based on likelihood of unauthorized access via credential-based attack vectors specific to the corresponding type of network element;
   selecting, by the computing system, a network element according to the ordering;
   attempting, by the computing system, to access a selected network element using one or more access credentials;
   selecting weak access credentials for the selected network element from a database of weak access credentials for the types of network elements, wherein the the weak access credentials are selected and attempted in a sequence ranked by historical likelihood of malicious use for the corresponding network element;
   attempting, by the computing system, to access the selected network element using the selected weak access credentials; and
   in response to successfully accessing the selected network element using the selected weak access credentials, applying a security process to the selected network element, wherein the security process comprises modifying access credentials or disabling access in response to the credential-based ordering and successful access.

2. The method of claim 1, the method further comprising:
   identifying, by the processing resource, a network administrator associated with the selected network element; and
   communicating, by the processing resource, a change implemented by the security process to the network administrator.

3. The method of claim 2, wherein applying the security process includes changing a password for the selected network element to use an updated password.

4. The method of claim 3, wherein communicating the change implemented by the security process includes communicating the updated password to the network administrator.

5. The method of claim 1, wherein applying the security process further includes changing a username for the selected network element.

6. The method of claim 1, wherein applying the security process includes disabling access to the selected network element.

7. The method of claim 6, wherein the access credential is a first access credential, and wherein the method further comprises:
   re-enabling access to the selected network element;
   attempting, by the processing resource, to access the selected network element using the first access credential and a second access credential; wherein the second access credential is a weak access credential; and
   based upon a successful access to the selected network element using the second access credential, re-applying, by the processing resource, the security process to the selected network element to render the selected network element secure.

8. The method of claim 1, wherein applying the security process includes quarantining the selected network element.

9. The method of claim 1, wherein identifying the selected network element on a computer network includes:
   determining, by the processing resource, that the selected network element on a computer network has been added to the computer network.

10. The method of claim 1, wherein the type of network element is a first type of network element, wherein the access credential is a first access credential, and wherein the selected network element is a first network element, the method further comprising:
   identifying, by the processing resource, a second network element on the computer network;
   attempting, by the processing resource, to access the selected network element using a second access credential, wherein the second access credential is selected from a group consisting of: a default access credential specific to a second type of network element corresponding to the second network element, and a weak access credential;
   based upon a successful access to the selected network element using the second access credential, applying, by the processing resource, the security process to the second network element to render the second network element secure.

11. A system for proactively policing and securing network elements, the system comprising:
   a processing resource;
   a non-transitory computer-readable medium, coupled to the processing resource, having stored therein instructions that when executed by the processing resource cause the processing resource to:
   receive information describing types of network elements on a network;
   generate an ordering of the set of network elements based on likelihood of unauthorized access via credential-based attack vectors specific to the corresponding type of network element;
   select a network element according to the ordering;
   attempt to access a selected network element using one or more access credentials;
   select weak access credentials for the selected network element from a database of weak access credentials for the types of network elements, wherein the the weak access credentials are selected and attempted in a sequence ranked by historical likelihood of malicious use for the corresponding network element;
   attempt to access the selected network element using the selected weak access credentials; and in response to successfully accessing the selected network element using the selected weak access credentials, apply a security process to the selected network element, wherein the security process comprises modifying access credentials or disabling access in response to the credential-based ordering and successful access.

12. The system of claim 11, wherein the non-transitory computer-readable medium further has stored therein instructions that when executed by the processing resource cause the processing resource to:

identify a network administrator associated with the selected network element; and communicate a change implemented by the security process to the network administrator.

13. The system of claim 11, wherein to apply the security process further comprises changing a password for the selected network element to use an updated password.

14. The system of claim 12, wherein communicating the change implemented by the security process includes communicating the updated password to the network administrator.

15. The system of claim 11, wherein to apply the security process further comprises changing a username for the selected network element.

16. The system of claim 11, wherein to apply the security process further comprises disabling access to the selected network element.

17. The system of claim 16, wherein the access credential is a first access credential, and wherein the non-transitory computer-readable medium further has stored therein instructions that when executed by the processing resource cause the processing resource to:

re-enable access to the selected network element; and attempt to access the selected network element using the first access credential and a second access credential; wherein the second access credential is a weak access credential; and based upon a successful access to the selected network element using the second access credential, re-apply the security process to the selected network element to render the network element secure.

18. The system of claim 11, wherein to apply the security process further comprises quarantining the selected network element.

19. A non-transitory computer-readable medium having stored therein instructions that when executed by a processing resource cause a computing system to:

receive information describing types of network elements on a network;

generate an ordering of the set of network elements based on likelihood of unauthorized access via credential-based attack vectors specific to the corresponding type of network element;

select a network element according to the ordering;

attempt to access a selected network element using one or more access credentials;

select weak access credentials for the selected network element from a database of weak access credentials for the types of network elements, wherein the the weak access credentials are selected and attempted in a sequence ranked by historical likelihood of malicious use for the corresponding network element;

attempt to access the selected network element using the selected weak access credentials; and in response to successfully accessing the selected network element using the selected weak access credentials, apply a security process to the selected network element, wherein the security process comprises modifying access credentials or disabling access in response to the credential-based ordering and successful access.

20. The non-transitory computer-readable medium of claim 19 further has stored therein instructions that when executed by the processing resource cause the processing resource to:

identify a network administrator associated with the selected network element; and communicate a change implemented by the security process to the network administrator.

* * * * *